US010652782B1

(12) United States Patent
Korpi et al.

(10) Patent No.: US 10,652,782 B1
(45) Date of Patent: May 12, 2020

(54) LATENCY REDUCTION BASED ON PACKET ERROR PREDICTION

(71) Applicant: NOKIA TECHNOLOGIES OY, Espoo (FI)

(72) Inventors: Dani Johannes Korpi, Helsinki (FI); Muhammad Irfan Ali, Espoo (FI); Mikko Uusitalo, Helsinki (FI); Leo Karkkainen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/705,965

(22) Filed: Dec. 6, 2019

(30) Foreign Application Priority Data

Jun. 28, 2019 (FI) .................................... 20195586

(51) Int. Cl.
H04W 28/04 (2009.01)
H04W 28/02 (2009.01)
H04W 24/10 (2009.01)

(52) U.S. Cl.
CPC ........... H04W 28/04 (2013.01); H04W 24/10 (2013.01); H04W 28/0236 (2013.01)

(58) Field of Classification Search
CPC .. H04W 28/04; H04W 24/10; H04W 28/0236
See application file for complete search history.

(56) References Cited

U.S. PATENT DOCUMENTS

2019/0036630 A1 1/2019 Svennebring et al.
2019/0141113 A1 5/2019 Ganapathi et al.

FOREIGN PATENT DOCUMENTS

WO WO 2017/127000 A1 7/2017
WO WO 2019/101193 A1 5/2019

OTHER PUBLICATIONS

Communication of Acceptance under section 29a of Patents Decree dated Nov. 22, 2019 corresponding to Finnish Patent Application No. 20195586.
N. Strodthoff et al., "Enhanced Machine Learning Techniques for Early HARQ Feedback Prediction in 5G," arXiv.org Cornell University, Jul. 27, 2018, pp. 1-14.

(Continued)

Primary Examiner — Asad M Nawaz
Assistant Examiner — Zhaohui Yang
(74) Attorney, Agent, or Firm — Squire Patton Boggs (US) LLP

(57) ABSTRACT

According to an aspect, there is provided a network node comprising means for performing the following. Initially, a trained machine learning algorithm for predicting a probability of failed delivery of data packets based on measurements is maintained in a database. The network node performs, for each of its wireless communication links, the following. The network node causes performing measurements relating to a first wireless communication link to form a measurement data set and predicts, using the trained machine learning algorithm and the measurement data set, a probability of failed delivery of a data packet over the first wireless communication link. The network node determines whether the probability of failed delivery of the data packet exceeds a threshold. If it does, the network node transmits to a first receiver the data packet over the first wireless communication link and one of a copy of the data packet and redundancy data.

20 Claims, 6 Drawing Sheets

(56) References Cited

OTHER PUBLICATIONS

Feb. 13, 2020 Office Action issued in German Patent Application No. 102019135861.2.

Nguyen, D. et al.; "Joint Network Coding and Machine Learning for Error-prone Wireless Broadcast." In: IEEE CCWC, Jan. 2017.

Natsui, M. et al.; "A Study of a Top-Down Error Correction Technique Using Recurrent-Neutral-Network-Based Learning."In: EEE NEWCAS, Jun. 2016.

Zhang, C. et al.; "Deep Learning in Mobile and Wireless Networking: A Survey." In: IEEE Communications Surveys & Tutorials, vol. 21, No. 3, pp. 2224-2287, Mar. 2019.

Herath, J.D. et al.; "A Deep Learning Model for Wireless Channel Quality Prediction." In: IEEE ICC, May 2019.

Liao, R.-F. et al.; "The Rayleigh Fading Channel Prediction via Deep Learning." In: Hindawi Wireless Communications and Mobile Computing, vol. 2018, Article ID 6497340, Jul. 2018.

LATENCY REDUCTION BASED ON PACKET ERROR PREDICTION

TECHNICAL FIELD

Various example embodiments relate to wireless communications.

BACKGROUND

Wireless networks often employ some type of a retransmission procedure to ensure successful transmission of data packets. In such retransmission procedures, the receiver often requests a retransmission of each data packet which it fails to decode. The transmission parameters are typically specified so that a pre-defined success rate is reached (e.g., 99%). Allowing some of the transmissions to fail results in a higher spectral efficiency at the cost of some additional latency and processing overhead. The main reason for not being able to guarantee 100% success rate for radio transmissions is the seemingly random nature of the wireless channel. If all statistically foreseeable circumstances were to be covered, the data rates would be very low due to the redundancy required for guaranteeing packet delivery even in the worst-case scenario. In most of the cases, such extreme redundancy would obviously not be needed.

Some of the aforementioned problems simply stem from the lack of a proper model for the underlying phenomena. In other words, by identifying these physical phenomena and modelling them by some means, it would be possible to further improve the efficiency of wireless systems.

WO 2017127000 A1 discloses methods, a system and user equipment of a wireless communications network for determining transmission conditions for real-time media flow. Said system enables selecting a suitable sending rate and error correction for real-time media, such as video, based on radio network statistics.

BRIEF DESCRIPTION

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
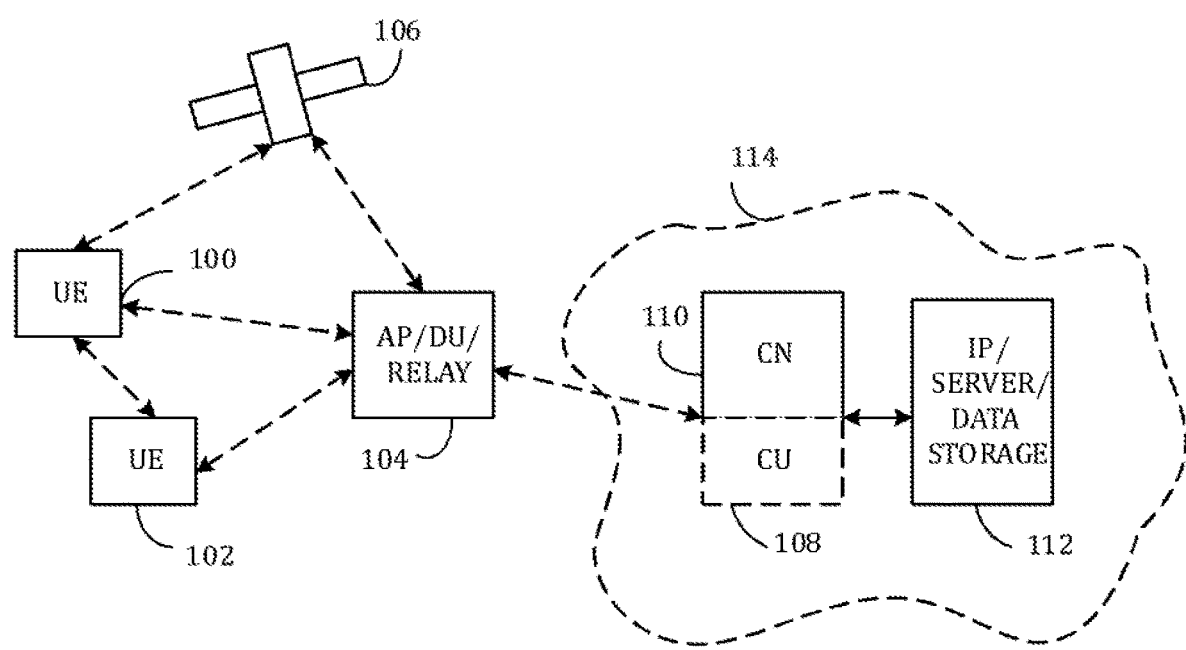
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 (equally called terminal devices) configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal or terminal device) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The embodiments to be discussed below relate specifically to providing redundancy in transmissions in a wireless communications system such as the system illustrated in FIG. 1 in order to deal with decoding errors in the receiving end. Decoding errors occur due to sudden adverse changes in the radio (or wireless) channel. Typically, the transmission parameters (e.g., transmission power) of the transmitter are configured such that in most cases a successful transmission is achieved. For instance, the transmitter might be configured so that on average 1% of the data packets will be lost due to noise or interference. In order to ensure that all of the data packets will be transmitted eventually, wireless communication networks typically rely on some type of a retransmission procedure, where the receiver requests the transmitter to retransmit the data packet which it the received but failed to decode. Allowing some of the transmissions to fail results in a higher spectral efficiency, at the cost of some additional latency and processing overhead.

The main reason for not being able to guarantee 100% success rate for radio transmissions is the apparent random nature of the wireless channel. If all statistically foreseeable circumstances were to be covered, the data rates would be very low due to the redundancy required for guaranteeing packet delivery even in the worst-case scenario. For most of the transmissions, such extreme redundancy would obviously not be needed. Consequently, this randomness is usually addressed simply by accepting that some of the transmissions fail and employing a retransmission procedure.

However, some of the randomness or unpredictability of the radio channel simply stems from the lack of a proper model for the underlying phenomena. In other words, by identifying these physical phenomena and modelling them by some means, it is possible to further improve the efficiency of wireless systems. However, most real radio environments (e.g., environments where smart phones are used) are extremely complex in terms of propagation and interference behavior due to complex multipath propagation phenomena and a plurality of transmitting user devices present. Statistical propagation models (e.g., Okumura-Hata model) do exist for modelling such scenarios. However, in said statistical propagation models no specific terrain data is typically considered and channel parameters are modelled as stochastic variables. Thus, they can provide only rough estimates for fading behavior in the real radio channel. A better solution is provided by machine learning (ML). The benefit of machine learning is that it is does not necessarily require knowledge of the (very complex) model of the underlying phenomena. The embodiments to be discussed below provide a solution that harnesses machine learning methodologies to make the radio channel more predictable and thereby alleviates some of the randomness.

The embodiments to be discussed below may be based on a plurality of different machine learning algorithms or techniques. In the following, a few non-limiting examples of machine learning algorithms which may be employed in embodiments are described.

The embodiments may employ supervised machine learning methods, that is, machine learning methods where an input-target pair is provided for training. Any time series prediction problem can be transformed into supervised machine learning by shifting the labels (i.e., the discrete values of the outcome variable to be predicted) by some time $t_0 > 0$:

$$y_{t+t_0} = f(X_t).$$

In the above equation, one can see that given some input features $X_t$ and a function $f$, we can predict $y_{t+t_0}$ if we shift the outputs labels by time $t_0$. Consequently, a typical time series prediction problem may be treated as supervised machine learning. Different supervised machine learning methods like Naive Bayes, Logistic Regression, Lasso Regression, Random Decision Trees, XGBoost, may be employed for time series prediction according to embodiments.

XGBoost, a scalable tree boosting system, is discussed in the following. However, in order to understand XGBoost, the concept of decision trees is first introduced. Decision trees are one of the popular choices for supervised machine learning methods, both for classification and regression, because they are easily understandable and highly interpretable. Knowledge learned by decision trees is preserved in the form of hierarchical tree data structures. Decision trees are built using recursive binary tree splitting. In this recursive splitting, all the features are considered and different splits are tried out. Splits with minimum cost function are considered. Each tree ends in end-nodes (nodes with no children), which decide the class of the input feature or some continuous value, depending on classification or regression problem. Decision trees are built in a two-step process comprising an induction step and a pruning step. During induction, desired features are represented as a hierarchical structure and a tree is built. Since decision trees may be subject to high overfitting, pruning is necessary to remove redundant structure from the trees, that is, to ensure that the decision tree does not overfit to the training data. Despite of the pruning, decision trees still tend to overfit and small changes in the dataset can lead to completely different trees (so-called variance). The bias and variance of decision trees may be mitigated using boosting and by training multiple trees.

XGBoost is one popular boosting ensemble learning method. As mentioned above, it is sometimes not sufficient to rely on just one machine learning method. Instead, multiple learners/models are trained and their predictive power is combined into one aggregated output, such as a voting system. Common ensemble methods are bagging and boosting. Both of these ensemble methods use boostrapping, random selection of features with replacement. Bagging (abbreviation of boostrap aggegration) aggregates the predictions of weak learners to predict the final output. Whereas in boosting, instead of simple averaging, a weighted average is calculated using the predictions of the weak learners. In XGBoost, trees are built sequentially and each subsequent tree aims to reduce the error of the previous tree. The base learners in XGBoost are weak learners with high bias. With weighted average of weak learner's predictions, a strong learner is obtained with low bias and variance.

The embodiments may, alternatively or in addition, employ one or more neural networks for the machine learning. Neural networks (or specifically artificial neural networks) are computing systems comprised of highly interconnected "neurons" capable of information processing due to their dynamic state response to external inputs. In other words, an artificial neural network is an interconnected group of nodes (or "neurons"), where each connection between nodes is associated with a weight (i.e., a weighting factor), the value of which affects the strength of the signal at said connection and thus also the total output of the neural network. Usually, a bias term is also added to the total weighted sum of inputs at a node. Training of a neural network typically involves adjusting said weights and biases so as to match a known output given a certain known input. The one or more neural networks employed in embodiments may comprise one or more feedforward neural networks and/or one or more recurrent neural networks.

An example of a feedforward neural network which may be employed in embodiments is a multilayer perceptron model or network which is a network of simple perceptrons. A single layer perceptron can be used to learn linearly separable functions but cannot be used to perform complex tasks like learning a non-linear decision boundary in classification. On the other hand, a multilayer perceptron network, which uses two or more layers of perceptrons, may be used to learn complex functions and highly non-linear decision boundaries. A multilayer perceptron network is a basic form a feedforward neural network and typically consists of an input layer, one or more hidden layers and an output layer. The network uses forward passes and back-propagation to learn the weights and bias. Forward passes (from input to output) calculate the outputs, while back-propagation calculates the necessary updates for the weights and biases based on the error at the output layer Feedforward neural networks do not have the capability to store any information since there are no loops in feedforward neural networks. Recurrent neural networks (RNNs), on the other hand, have loops in them allowing information to be maintained. One example of a recurrent neural network which may be employed in embodiments is a long short term memory (LSTM) which is a special type of recurrent neural network specialized in learning long-term dependencies. A single LSTM cell consists of three gates (input, output and forget gate) and a memory cell. Gates act as regulators of information and help LSTM cells to remove old information or add new information. The extent to which the existing memory is forgotten is controlled by the forget gate. Another example of a recurrent neural network which may be employed in embodiments and which is also capable of learning long-term dependencies is a gated recurrent unit (GRU). While long short term memories employ three gates, there are only two gates in a GRU (called reset and update gate) which makes gated recurrent units simpler and faster than long short term memories.

Figure 2:
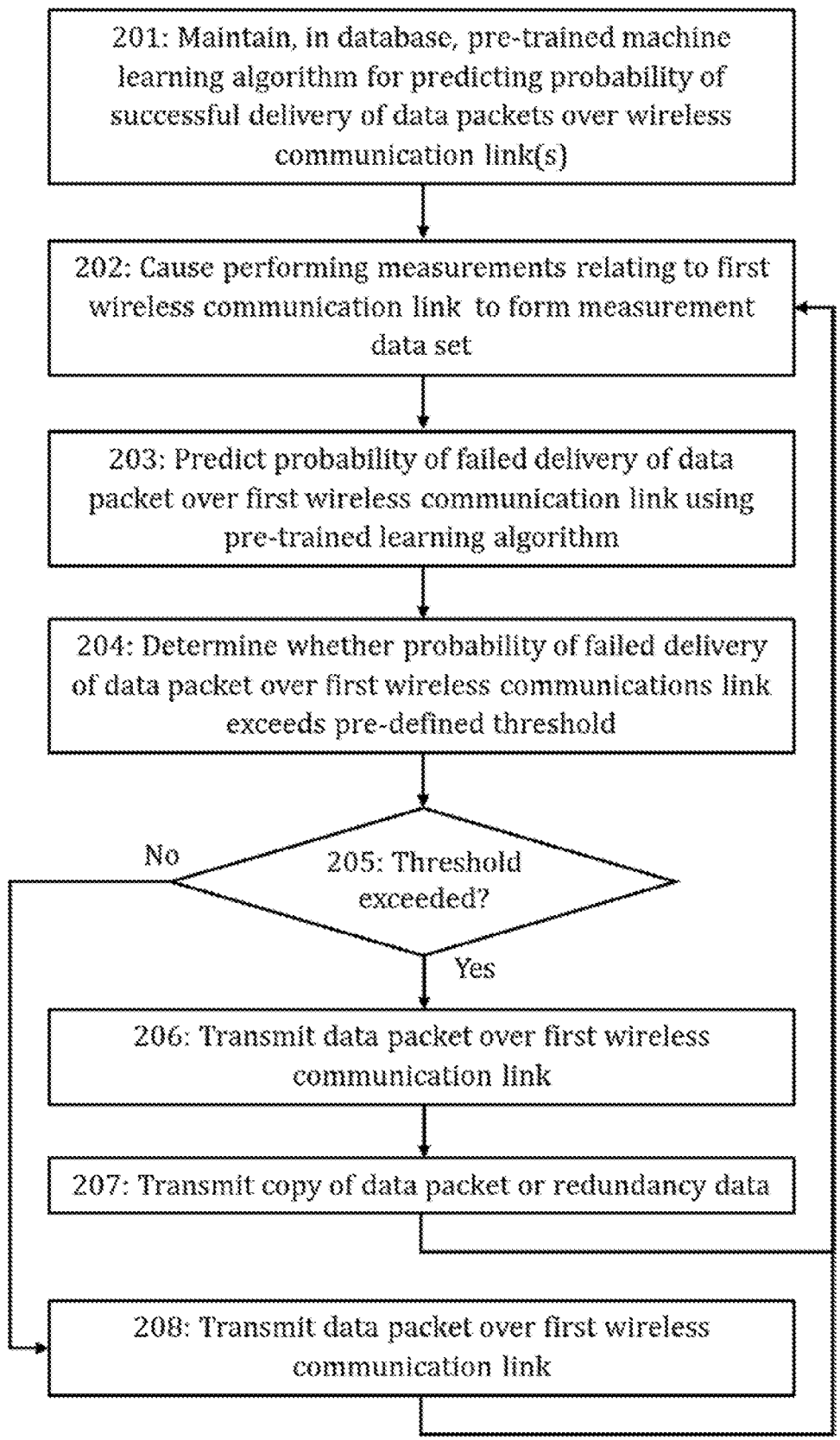
FIGS. 2 to 7 illustrate exemplary processes according to embodiments.

FIG. 2 illustrates a process according to embodiments for predicting a probability of failed delivery of data packets to be transmitted and carrying out proactively retransmissions of data packets or parts thereof based on said prediction so as to reduce latency and to improve efficiency without sacrificing performance (e.g., in terms of data rate). The illustrated process may be performed by a network node (of a wireless communications network). Specifically, said network node carrying out the process may be any network node for transmitting data packets over one or more wireless communication links to one or more receivers. The network node may be a base station (i.e., an access node). For example, the network node carrying the process may be the element 104 of FIG. 1. The network node (or specifically the base station) may be configured to employ multiple-input and single-output (MISO), multiple-input and multiple-output (MIMO) and/or multi-user MIMO (MU-MIMO) techniques. The network node and the one or more receivers (or a subset thereof) may be configured to use hybrid automatic repeat request (HARQ) procedure for error control and correction. Said one or more receivers may comprise one or more terminal devices and/or one or more base stations. In some embodiments, the network node may be a terminal device such as either of elements 100, 102 of FIG. 1. In some embodiments, the one or more wireless communication links comprise a plurality of wireless communication links and the one or more receivers comprise a plurality of receivers.

Referring to FIG. 2, it is initially assumed in block 201 that the network node maintains, in a database, a trained machine learning algorithm for predicting a probability of failed delivery of data packets over the one or more wireless communication links based on measurements relating to the one or more wireless communication links. Specifically, said measurements may comprise system measurements of the network node and/or radio measurements of the one or more wireless communication links. The probability of failed delivery of a data packet corresponds specifically to the probability that the initial delivery of said data packet to a target receiver fails due to a failure to decode the data packet in the receiver (i.e., a decoding error in the receiver). Thus, said probability of failed delivery does not account for any possible retransmission of the data packet, e.g., using HARQ procedure. The trained machine learning algorithm may be based on an XGBoost algorithm, one or more multilayer perceptron networks, one or more recurrent neural networks, one or more long short term memories (LSTMs), one or more gated recurrent units (GRUs) or a combination thereof.

The generation and training of the trained machine learning algorithm may be carried out by the network node, for example, as is discussed below in relation to FIG. 4. In other embodiments, the trained machine learning algorithm may be generated and/or trained by an entity (e.g., a network node or a computing device) other than the network node performing processes of FIG. 2. In such embodiments, the training data set used for training the machine learning algorithm may still be collected by the network node performing processes of FIG. 2.

The actions described in relation to block 202 to 208 may be carried out for each of the one or more wireless communication links (that is, for each of the one or more receivers) separately (in parallel). In the following said processes are described for an exemplary first wireless communication link of said one or more wireless communication links between the network node and a first receiver. In other words, the first wireless communication link may correspond to any of the one or more wireless communication links.

The network node, first, causes, in block 202, performing measurements (e.g., radio measurements and system measurements) relating to the first wireless communication link to form a measurement data set for the first wireless communication link. Said measurements may be carried out by the network node itself and/or by another entity (e.g., another network node). The measurement data set acting (to be used as the input of the trained machine learning algorithm for the first wireless communication link) may comprise system measurements of the network node and/or radio measurements of the first wireless communication links. In other words, the measurements of the measurement data set may comprise one or more measurements quantifying the radio channel of the first wireless communication link, one or more measurements quantifying the state of the network node (e.g., in terms of resources used/available) and/or one or more measurements pertaining to the current configuration of the network node (e.g., modulation and coding used for transmission). The measurements performed in block 202 (forming the measurement data set and to be used as an input of the trained machine learning algorithm) may correspond to measurements performed over a pre-defined time window (e.g., 15 ms). Said pre-defined time window may be defined in terms of (consecutive) time transmission intervals (TTIs). For example, measurements may be collected for 15 consecutive TTIs preceding the data packet to be evaluated.

In some embodiments, the measurement data set formed in block 202 (and to be used acting as the input of the trained machine learning algorithm) may comprise measurement data of one or more measurements of one or more of the following types:
- a channel quality indicator (CQI) compensation factor for one or more data channels (e.g., physical downlink shared channel, PDSCH) and/or one or more control channels (e.g., physical downlink control channel, PDCCH),
- a compound CQI of one or more spatial streams associated with the network node,
- a modulation and coding scheme (MCS),
- a modulation order,
- an average signal-to-noise ratio, SNR, of an associated radio bearer group,
- an average throughput of the receiver over the physical downlink shared channel (PDSCH),
- an average amount of allocated PDSCH resources for the first receiver and
- a recommended MCS for the hybrid automatic repeat request (HARQ) retransmissions.

The measured quantities listed above or a subset thereof may correspond to the features (i.e., inputs) of the trained machine learning algorithm. In machine learning terminology, a feature is an attribute or property shared by all of the independent units on which analysis or prediction is to be done.

The network node predicts, in block 203, a probability of failed delivery of a data packet over the first wireless communication link to the first receiver using the trained machine learning algorithm. The measurement data set of the first wireless communication link calculated in block 202 is used in block 203 as an input of the trained machine learning algorithm. Said data packet may specifically be the next data packet to be transmitted by the network node. The measurement data set may corresponds to measurement data collected (or measured) during the transmission of a pre-defined number of preceding data packets (or during a pre-defined number of preceding TTIs). In other words, the prediction is performed based on the recent measurement history pertaining to the first wireless communication link. In some embodiments, the network node may also calculate, in block 203, a value of a metric quantifying the reliability of the predicted probability of failed delivery (e.g., a variance or a standard deviation).

The network node determines, in block 204, whether the probability of failed delivery of the data packet over the first wireless communication link exceeds a threshold. The threshold may be a pre-defined threshold (maintained in the database). The threshold may be specific to the first wireless communication link, that is, other wireless communication links of the one or more wireless communication links may be associated with different thresholds. In other embodiments, a common threshold may be defined for all wireless communication links of the network node. In some embodiments, each threshold may be adjusted dynamically by the network node based on the current configuration of the network node and the system state of the network node. The exceeding of the threshold indicates that there is a significant likelihood that the transmission of the data packet is unsuccessful and thus special actions should be taken (i.e., a retransmission should be triggered) to ensure successful transmission of the data packet without undue delay. As a general rule, the threshold may be defined such that it is exceeded only if there is a high likelihood that the action carried out (specifically in block 207) improves the corresponding link and/or network performance without (significant) adverse effects.

In some embodiments, the threshold may be affected by the latency requirements of the corresponding wireless communication link. If the latency requirement is stringent, the threshold may be set so that even a small likelihood of failed packet delivery triggers an action, while the threshold may be set in a more conservative manner if the latency requirement is more relaxed.

In response to the probability of failed delivery of the data packet exceeding the threshold in block 205, the network node transmits, in block 206, the data packet over the first wireless communication link to the first receiver. As mentioned above, the exceeding of the threshold signifies that there is a considerable likelihood that the transmission in block 206 will not successful. Therefore, in response to the probability of failed delivery of the data packet exceeding the threshold in block 205, the network node further transmits, in block 207, to the first receiver one of a copy of the data packet and redundancy data for the data packet. Specifically, the redundancy data for the data packet may be data for decoding the transmitted data packet in the case of a decoding error (in the receiver). The network node transmits said one of the copy of the data packet and the redundancy data immediately (i.e., using the first available resource)

after the initial transmission of the data packet (e.g., said secondary transmission may be carried out in response to the transmitting of the data packet). It should be noted that if there is congestion in the network node, that is, if all the resources are already reserved for a certain number of proceeding TTIs, the retransmission cannot be carried out right away, but is, instead, carried out (or scheduled) using the first available resource. In other words, the network node proactively retransmits the data packet or transmits the redundancy data without waiting for a potential negative acknowledgment to be transmitted as a part of a conventional HARQ procedure in the case of a decoding error. If the decoding of the initial data packet fails in the receiver, the first receiver may discard said initial data packet and decode the retransmitted data packet or the receiver may combine the initial non-decodable data packet with the redundancy data to derive a decoded data packet. If the decoding of the initial data packet is successful, the first receiver may ignore any retransmission of the data packet and/or any transmissions of redundancy data. The reduced latency stemming from the fact that the prediction allows one to retransmit the data packet or transmit the redundancy data without waiting for the feedback (i.e., a positive/negative acknowledgment) from the first receiver is one of the major advantages provided by the embodiments.

In some embodiments, the amount of redundant information in the redundancy data may be adjusted by the network node based on results of the prediction in block 203 (assuming that the trained machine learning algorithm is able to provide such information accurately). To achieve this functionality, the machine learning algorithm may encode, in some embodiments, information regarding the future channel conditions into the predicted probability of failed delivery such that high probabilities of failed delivery indicate extremely poor signal quality at the receiver, while lower probabilities indicate less severe fading and/or interference. In the former case, more redundant information may be provided by the network node to ensure that the data packet can be decoded, while in the latter case less redundancy suffices. This functionality may be implemented in accordance with the existing HARQ procedure or with some other method, for example, utilizing Raptor codes or any other solution for providing incremental redundancy.

The transmission in block 207 may be carried out over the first wireless communication link. Alternatively, the transmission in block 207 may be carried out by relay using a second wireless communication link which is one of two or more wireless communication links of the network node. The second wireless communication link is a wireless communication link between the network node and a second receiver of the one or more receivers. The second receiver may specifically be a transceiver or transmit-receive point such as an access node, a relay node or a terminal device. The second receiver may transmit the copy of the data packet or the redundancy data to the first receiver directly over a single wireless communication link or using multi-hop routing over two or more wireless communication links. The non-direct transmission of the copy of the data packet and/or redundancy data may utilize any established multi-point transmission, dual connectivity or device-to-device communication scheme available.

In some embodiments, the transmission of said one of the copy of the data packet and the redundancy data for the data packet may be carried out, by the network node (e.g., an access node), by relay using at least a fixed wired communication link (e.g., a backhaul link) between the network node and a wired receiver (or specifically a wired transceiver such as an access node). Said wired receiver may transmit said one of the copy and the redundancy data via at least one wireless communication link to the first receiver (e.g., a terminal device). In some embodiments, the transmission of said one of the copy of the data packet and the redundancy data to the first receiver may be carried using one or more wired communication links and one or more wireless communication links.

In response to the probability of failed delivery of the data packet failing to exceed the threshold in block 205, the network node transmits, in block 208, the data packet over the first wireless communication link to the first receiver. In other words, the network node transmits the data packet by conventional means.

Upon receiving the data packet and one of the copy of the data packet and the redundancy data or just the data packet, the first receiver may transmit, according to HARQ procedure, a positive acknowledgment (ACK) if the decoding of the data packet is successful or a negative acknowledgment (NACK) if the decoding of the data packet fails. Said ACK or NACK may be received by the network node.

In some embodiments, the network node may use a probability of a successful delivery, instead of the probability of failed delivery, in the processes of blocks 203 to 205. In such embodiments, the threshold, in block 204, should also be defined in an inverse manner meaning that blocks 206, 207 are carried out if the probability of the successful delivery fails to exceed the threshold and block 208 is carried out if the probability of the successful delivery exceeds the threshold.

In some embodiments, block 208 of FIG. 2 may be omitted (e.g., it may be carried out in a separate process).

Figure 3:
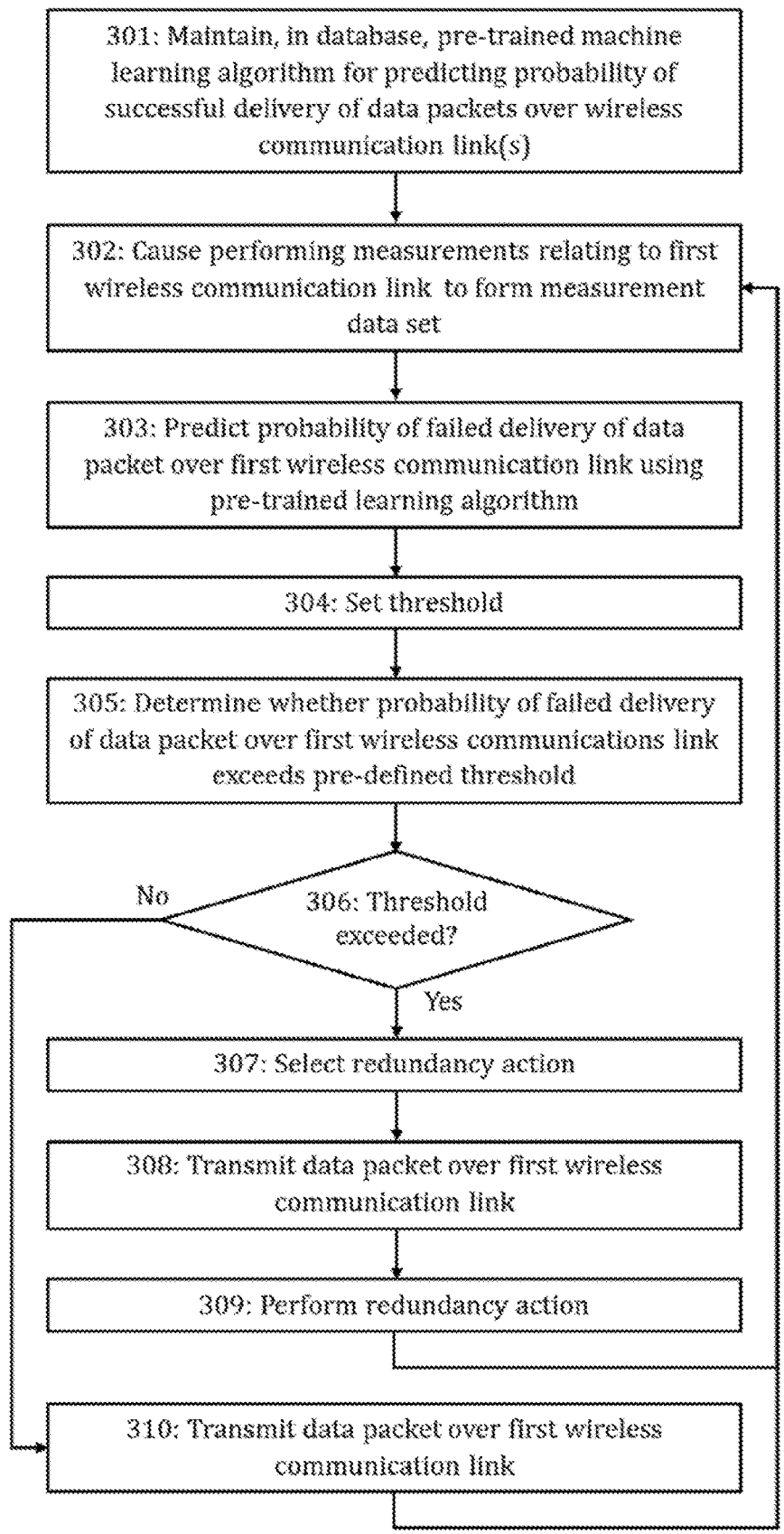

FIG. 3 illustrates an alternative process according to embodiments for predicting a probability of failed delivery of data packets to be transmitted and carrying out proactively retransmissions of data packets or parts thereof based on said prediction. The illustrated process may be performed by any entity (that is, any network node) described in relation to FIG. 2 as performing the process of FIG. 2. In general, the process of FIG. 3 corresponds to a large extent to the process of FIG. 2. Any definitions given in relation to FIG. 2 apply or may be combined with the process of FIG. 3 (unless otherwise stated).

Referring to FIG. 3, the initial blocks 301 to 303 as well as the following blocks 305, 306, 308, 310 may correspond fully to blocks 201 to 206, 208 of FIG. 2. Thus, the actions pertaining to said blocks are not discussed here for brevity. Instead, the discussion is concentrated on the two additional features introduced in FIG. 3 as block 304 and blocks 307, 309. In some alternative embodiments, only one of said additional features may be implemented.

After the network node has predicted, in block 303, a probability of failed delivery of a data packet, the network node sets or defines, in block 304, a threshold based on a state and/or a configuration of the network node. In other words, the threshold is defined dynamically as opposed having a pre-defined value as in the process of FIG. 2. After the threshold has been set or defined, it is employed in a similar manner as described in relation to FIG. 1.

In some embodiments, the threshold may be defined or set dynamically specifically based on one or more of the following quantities (or specifically at least by their current values):

amount of available resources (e.g., bandwidth) in the network node,
    a pre-defined reliability requirement of the (first) wireless communication link, a pre-defined (spectral) efficiency requirement of the (first) wireless communication link, a latency requirement of a (first) wireless communication link and/or of the data packet to be transmitted and a statistical accuracy of the trained machine learning algorithm.

It should be noted that the pre-defined reliability requirement and the pre-defined efficiency requirement are connected to each other as high reliability inevitably leads to decreased efficiency and vice versa. The statistical accuracy of the trained machine learning algorithm may correspond to statistical accuracy of the predicted probability of failed delivery for the data packet (calculated possibly in block 203) or to overall statistical accuracy of the trained machine learning algorithm (calculated, e.g., during the training of the machine learning algorithm).

Specifically, the network node may be configured to increase the threshold, if there are few available resources in the network node (i.e., the network node is operating under a high load). By increasing the threshold, the number of unnecessary retransmissions is minimized. On the other hand, the network node may be configured to decrease the threshold, if there is a large number of available resources in the network node in such a case even a large number of unnecessary retransmissions does not result in congestion.

Alternatively or in addition, the network node may be configured to increase the threshold in response to the data packet to be transmitted being configured with a relaxed (i.e., high) latency requirement. Correspondingly, the network node may be configured to decrease the threshold (even in the case of congestion) in response to the data packet to be transmitted being configured with a strict (i.e., low) latency requirement.

Similar rules as described above for the amount of available resources and the latency requirement may be configured to the network node for any of the other quantities listed above with a decrease in the threshold resulting from a high reliability requirement, low efficiency requirement and/or a low statistical accuracy and an increase in the threshold resulting from a low reliability requirement, a high efficiency requirement and/or a high statistical accuracy. The increasing and decreasing of the threshold may be carried out based on upper and lower limits defined for each quantity or in a more continuous manner based on a pre-defined function with each quantity acting as an argument of the function. For example, the pre-defined function may be a linear function with pre-defined weighting factors defined for each quantity.

In some embodiments, the threshold may not be adjusted for each data packet to be transmitted as discussed above. Instead, the threshold may be adjusted for every N data packet (N being an integer) or periodically according to a pre-defined period.

Referring to the second additional feature introduced in FIG. 3, in response to the probability of failed delivery of the data packet exceeding the threshold in block 306, the network node selects, in block 307, a redundancy action to be performed for providing redundancy in the delivery of the data packet following a pre-defined selection criteria, before initiating any transmission. The redundancy action may be selected from any of the transmission options described in relation to block 207 of FIG. 2 (e.g., transmission of a copy of the data packet or redundancy data over the first wireless communication link or one or more other wireless and/or wired communication links). The pre-defined selection criteria may comprise criteria for one or more of an availability of each action, a system state of the network node and a configuration of the network node. In some embodiments, the adjusting of the amount of redundant information included in the redundancy data based on the predicting in block 303 (as described in relation to FIG. 1) may be carried out as a part of block 307.

Assuming that the first receiver to which the data packet is to be transmitted is a first terminal device, the network node (being, e.g., an access node) may select a redundancy action (in block 307) from a plurality of redundancy actions following the pre-defined criteria, where the plurality of redundancy actions (i.e., redundancy actions available for selection by the network node) may comprise one or more of the following redundancy actions:

transmitting the copy of the data packet to the first terminal device over the first wireless communication link, transmitting the redundancy data to the first terminal device over the first wireless communication link, transmitting the copy of the data packet to the first terminal device by relaying the copy over a second wireless communication link between the network node and an access node and over one or more third wireless communication links between the access node and the first terminal device, transmitting the redundancy data to the first terminal device by relaying the redundancy data over a second wireless communication link between the network node and an access node and over one or more third wireless communication links between the access node and the first terminal device, transmitting the copy of the data packet to the first terminal device by relaying the copy over a second wireless communication link between the network node and a second terminal device and over one or more third wireless communication links between the second terminal device and the first terminal device, transmitting the redundancy data to the first terminal device by relaying the redundancy data over a second wireless communication link between the network node and a second terminal device and over one or more third wireless communication links between the second terminal device and the first terminal device, transmitting the copy of the data packet to the first terminal device by transporting the copy over a fixed wired communication link between the network node and an access node and over one or more fourth wireless communication links between the access node and the first terminal device and transmitting the redundancy data to the first terminal device by transporting the redundancy data over a fixed wired communication link between the network node and an access node and over one or more fourth wireless communication links between the access node and the first terminal device.

In the above list of redundancy actions, the one or more third wireless communication links correspond specifically to consecutive wireless communication links in a multi-hop scenario.

After the redundancy action has been selected in block 307, the network node transmits, in block 308, the data packet over the first wireless communication link and performs, in block 309, the selected redundancy action. The actions performed in blocks 308, 309 may correspond actions performed in blocks 206, 207 (though in this case the transmission in block 207 is conducted according to the selection in block 307).

Figure 4:
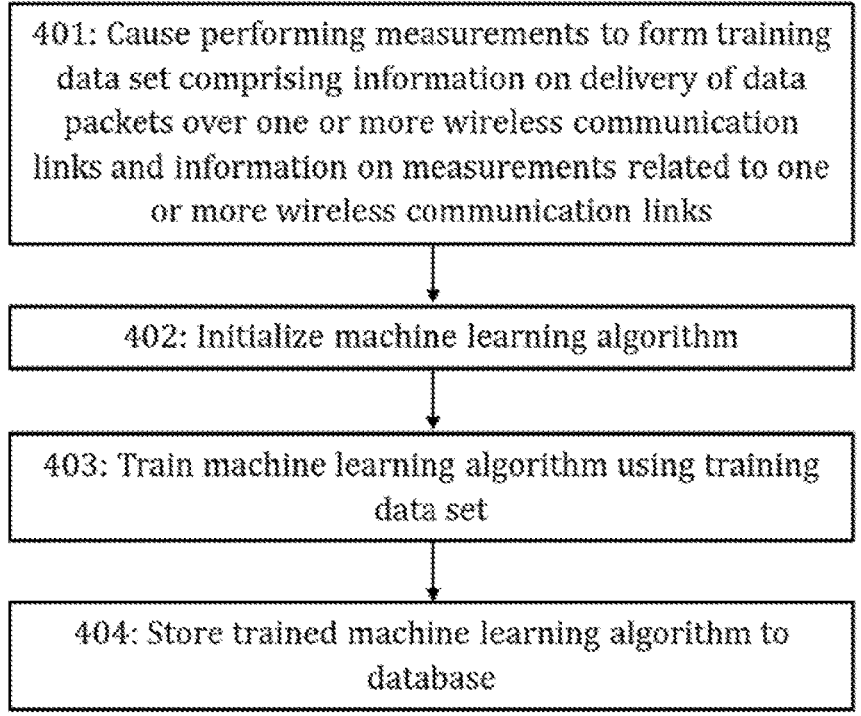

FIG. 4 illustrates a process for generating and training the machine learning algorithm employed in processes of FIG. 2 and/or FIG. 3. The process may be carried out by the same network node which subsequently carries out the predicting using the (pre-)trained machine learning algorithm according to embodiments (e.g., by any entity carrying out the processes illustrated in FIGS. 2 and/or 3 according to embodiments). Alternatively, the training may be carried out by a separate device (e.g., a network node or some other computing device) utilizing information on previous measurements stored to a database.

Referring to FIG. 4, the network node causes, in block 401, performing measurement to form a training data set comprising information on delivery of data packets over the one or more wireless communication links and information on measurements relating to the one or more wireless communication links concurrent with the delivery of the data packets. The measurements for forming the training data set may be collected by the network node during the normal operation of the network node (before any delivery prediction scheme according to embodiments has been established). The training data set may be stored to the database of the network node. The raw measurement data may be processed to a suitable format for machine learning before forming the training data set, for example, following a process as will be discussed in relation to FIG. 5.

The information on delivery of data packets over the one or more wireless communication links comprised in the training data set may comprise at least information on whether or not each delivery of a data packet using any of the one or more wireless communication links was successful. The information on delivery of data packets may be evaluated based on a positive or negative acknowledgment (i.e., ACK or NACK) transmitted by the receiver according to HARQ procedure and received in the network node following the initial transmission of the data packet. Thus, the information on delivery of data packets corresponds to initial transmission of the data packet not taking into account any possible retransmission (e.g., using HARQ). For example, the reception of an ACK may correspond to a numeric value of zero and the reception of a NACK may correspond to a numeric value of one.

The information on measurements relating to the one or more wireless communication links comprised in the training data set may correspond to a plurality of measurement data sets as described in relation above embodiments. In other words, while a measurement data set is defined above to comprise only measurement information necessary for predicting the probability of failed delivery of a data packet to be transmitted (e.g., measurements conducted over a pre-defined time window such as 15 TTIs), the training data set may comprise measurement information collected or measured over a much longer time span (e.g., over tens of thousands of TTIs) so as to be able to train the machine learning algorithm to reach a sufficiently high prediction accuracy.

The network node initializes, in block 402, a machine learning algorithm. The machine learning algorithm may be any machine learning algorithm as discussed above in relation to embodiments, e.g., an XGBoost algorithm or a neural network-based algorithm employing one or more feedforward neural networks and/or one or more recurrent neural networks. The initialization may comprise setting or selecting initial values for weights, parameters and/or hyperparameters of the machine learning algorithm (e.g., weights of one or more neural networks or hyperparameters of an XGBoost algorithm). While values of "normal" parameters and weights are trained during the training process (i.e., they change), a hyperparameter is a parameter whose value is set before the learning process begins and which does not change during the learning process. The initial values may be random values (especially weights and parameters) or they may correspond to a pre-defined set of values known to result in a well-performing algorithm (especially hyperparameters but also possibly weights and parameters). Any known initialization technique may be employed in the initialization.

The network node trains, in block 403, the machine learning algorithm using the training data set. Specifically, the information on the information on measurements relating to the one or more wireless communication links may define features (i.e., input) of the machine learning algorithm and the information on the delivery of data packets over the one or more wireless communication links may define labels (i.e., output) of the machine learning algorithm. In some embodiments, the training data set may be pre-processed to a suitable format before it is inputted to the machine learning algorithm as will be described in detail in relation to FIG. 5.

Finally, the network node stores, in block 404, the trained machine learning algorithm to the database. Subsequently, the network node may employ said stored trained machine learning algorithm for performing the prediction according to embodiments.

In some embodiments, the actions pertaining to blocks 402 to 404 may be carried out offline (i.e., when the one or more wireless communication links involving the network node have been disabled or cut off). In other embodiments, the actions pertaining to blocks 402 to 404 may be carried out online during normal operation of the network node.

In some embodiments, the network node may be configured to perform only block 401. After forming the training data set according to block 401, the network node may, in such embodiments, transmit the training data set to another network node or computing device which then carries out blocks 402, 403 and transmits the trained learning algorithm to the network node. The network node may then store the trained learning algorithm to the database.

Figure 5:
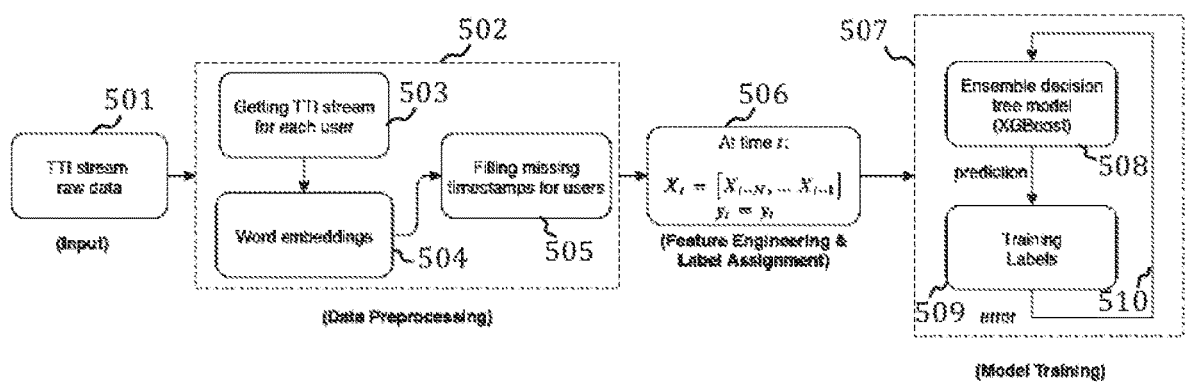

FIG. 5 illustrates another process for training the machine learning algorithm employed in processes of FIG. 2 and/or FIG. 3. The process may be carried out by the same network node which subsequently carries out the predicting using the (pre-)trained machine learning algorithm according to embodiments (e.g., by any entity carrying out the processes illustrated in FIG. 2 according to embodiments). The process of FIG. 5 may correspond to a more detailed view of block 401 to 403 of FIG. 4.

In FIG. 5, it is assumed that the machine learning algorithm to be trained is an XGBoost algorithm. However, it should be noted that actions pertaining to elements 501 to 506 are not specific to XGBoost and thus they may be applied to embodiments where the machine learning algorithm is an algorithm other than XGBoost.

The starting point or input of the illustrated training process is a raw training data stream (i.e., TTI stream raw data) 501 received by the network node. Before this data 501 is fed to the machine learning algorithm, two additional processing stages 502, 506 are applied. First, the raw training data stream 501 is pre-processed, by the network node, in element 502. Specifically, the pre-processing comprises separating, from the raw training data stream, one or more data streams associated, respectively, with the one or more wireless communication links. Each of the one or more wireless communication links may correspond to a different terminal device or user. Then, if any of the one or more data streams of the raw training data stream comprises string data, the pre-processing comprises performing, in element 504, word embedding for said string data. In other words, string data is mapped to numerical values so that it may be used as an input of the machine learning algorithm. As different terminal devices or users may occupy different time slots with differing spacings between the consecutive time slots, the one or more data streams do not have the same form (e.g., data points with uniform sampling intervals). To homogenize the data, the pre-processing comprises filling, in element 505, any temporal data gaps in each of the one or more data streams of the raw training data stream with surrogate values. Each surrogate value (or a label) may correspond to a zero or a preceding value for a corresponding data stream depending on a type of associated data. Specifically, filling the temporal data gaps may comprise filling both time samples and corresponding (data) labels with missing time stamps and surrogate labels, respectively.

After the pre-processing in element 502, the network node carries out, in element 506, feature engineering on the one or more pre-processed data streams and assigns labels to the one or more pre-processed data streams. According to a general definition, feature engineering is a process of selecting and transforming variables (i.e., features) to be used as an input of the machine learning algorithm. Specifically, said variables are predictor variables believed to contain data for predicting an outcome variable (here, the probability of failed delivery of a data packet). Label is a name for a discrete value of the outcome variable.

In order to prepare features (or predictor variables) for the prediction (or specifically for time series prediction), it is common practice to use lagged values of features (and possibly also labels) to predict the future values of features and labels or just labels. Here, the lagged values of features are used to predict the labels. The lagged features for predicting a label for the current time t may be written as a vector $X_t = [X_{t-N}, \ldots, X_{t-1}]$, where N is the pre-defined number of preceding features taken into account in the predicting. The assigning of the labels in block 506 comprises shifting the (training) labels in the one or more pre-processed data streams in a corresponding manner, that is, setting the label as $y_t$, which corresponds to the next TTI after the most recent feature. Moreover, the feature-label pairs with surrogate labels are omitted during training as they correspond to a case where the real label is unknown, thereby not containing any useful data from the learning perspective. The output provided by the element 506 may correspond to the training data set, as discussed in relation above embodiments.

After the feature engineering and label assignment in element 506, the actual training of the machine learning algorithm is carried out, by the network node, in element 507 using the formed training data set. In the illustrated example, the machine learning algorithm is an XGBoost algorithm as mentioned above. The training comprises feeding the features defined in element 506 to the machine learning algorithm to predict, in element 507, corresponding labels (i.e., the predicted probability of failed delivery). Each predicted label is compared, in element 509, to the corresponding label in the training data set and an error is calculated. Said corresponding label in the training data set may have a value of zero or one (corresponding to 0% or 100% probability of failed delivery of a data packet) depending on whether an ACK or a NACK, respectively, was received in the network node following the transmission of the corresponding data packet. Based on each calculated error, the machine learning algorithm is adjusted, in element 410, so as to improve the prediction accuracy.

Figure 6:
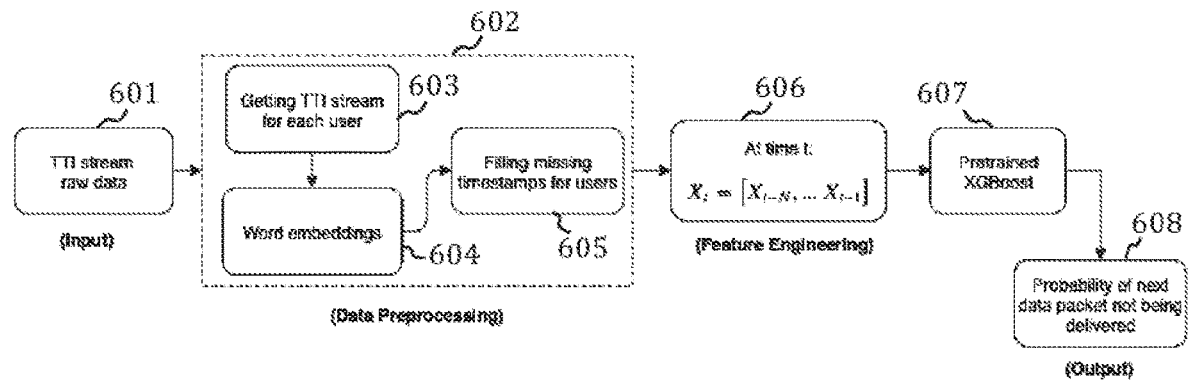

FIG. 6 illustrates another process according to embodiments for predicting the probability of failed delivery using the trained machine learning algorithm. The process of FIG. 6 may correspond to a more detailed view of blocks 202, 203 of FIG. 2 and/or block 302, 303 of FIG. 3. The process of FIG. 6 may correspond specifically to prediction carried out using a machine learning algorithm trained according to the process of FIG. 5.

Many of the elements in FIG. 6 correspond to similar actions as described in relation to FIG. 5 though with the obvious difference that the input TTI stream raw data 601 corresponds, in this case, to a raw measurement data stream for which no labels are available (as no transmission of the data packet has yet occurred). In other words, one or more measurement data sets for the one or more wireless communication links, instead of a training data set (encompassing also all of the one or more wireless communication links), may be formed and processed. The received raw measurement data stream 601 may correspond to raw data collected through measurements of the one or more wireless communication links in block 202 of FIG. 2 and/or block 302 of FIG. 3.

Blocks 602 to 605 may correspond to blocks 502 to 505 of FIG. 5, respectively. The feature engineering in block 606 may be carried out as described in relation to block 506 of FIG. 5 though obviously no label assignment is performed in block 606. The result or output of the feature engineering in block 606 may correspond to one or more measurement data sets of the one or more wireless communication links (as discussed in relation to above embodiments).

After the feature engineering in block 606, the past values of features $[X_{t-N}, \ldots, X_{t-1}]$ are inputted to the trained machine learning algorithm 607 (specifically a trained XGBoost algorithm in FIG. 5). The trained machine learning algorithm 507 provides as its output a predicted current label, that is, the predicted probability of failed delivery of the data packet to be transmitted 608.

Figure 7:
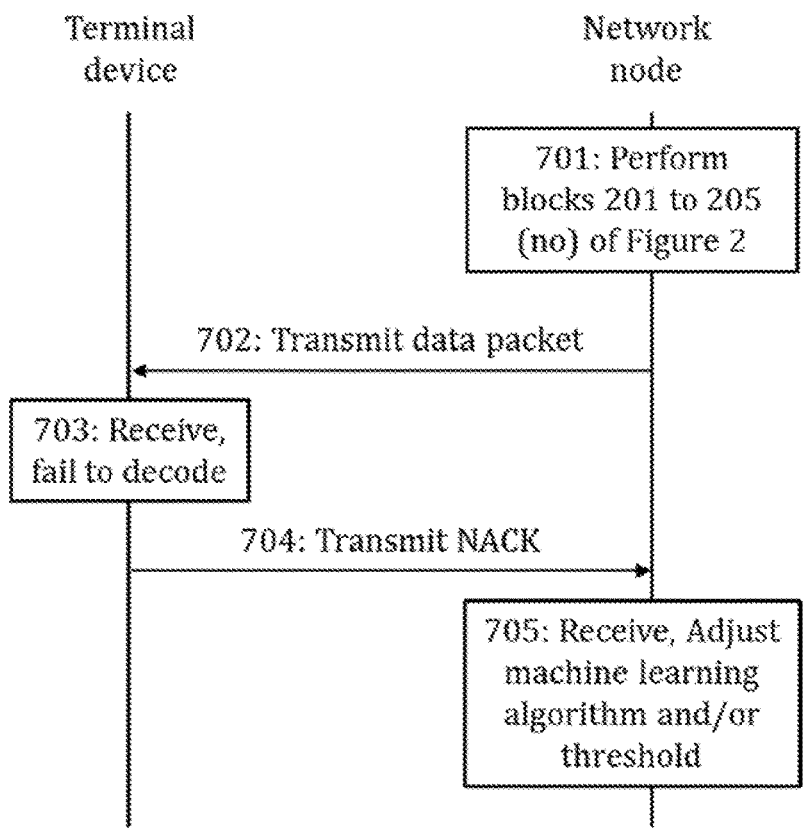

FIG. 7 shows a signaling diagram illustrating processes according to embodiments for enabling adjusting the prediction. Specifically, FIG. 7 shows signaling between a network node and a terminal device over a wireless communication link. The terminal device is to be considered merely a non-limiting example of a type of a receiver for performing the illustrated processes. It is assumed in FIG. 7 that the terminal device (or other computing device) in question is configured to use HARQ procedure.

Referring to FIG. 7, the network node performs, in block 701, blocks 201 to 205 (no) of FIG. 2 or alternatively blocks 301 to 306 (no) of FIG. 3. In other words, the network node maintains in the database a trained machine learning algorithm for predicting a probability of failed delivery of a data packet at least over the aforementioned wireless communication link to the aforementioned terminal device, causes performing measurements relating to said wireless communication link to form a measurement data set of said wireless communication link, predicts the probability of failed delivery of the next data packet to be transmitted to the terminal device based on the measurement data set and determines that the probability of failed delivery fails to exceed a (pre-defined) threshold. As it is predicted that proactive retransmission of the data packet or transmission of redundancy data is not necessary for the next data packet, the network node transmits, in message 702, only the data packet to the terminal device over the wireless communication link. The terminal device receives, in block 703, the data packet and tries to decode it but fails (also in block 703). Consequently, the terminal device transmits, in message 704, a negative acknowledgment (NACK) to the network node over the wireless communication link.

In response to receiving the negative acknowledgment from the terminal device in block 705, the network node adjusts, in block 705, the trained machine learning algorithm and/or the threshold based on the negative acknowledgment. The adjusting of the trained machine learning algorithm may comprise adjusting one or more weights and/or (hyper) parameters of the trained machine learning algorithm (e.g., one or more weights of one or more neural networks). In general, the adjusting in block 705 may be carried out so that more data packets over time exceed the threshold at least for the wireless communication link in question. For example, this may be achieved by lowering the threshold for the wireless communication link.

The blocks, related functions, and information exchanges described above by means of FIGS. 2 to 7 in no absolute chronological order, and some of them may be performed simultaneously or in an order differing from the given one. Other functions can also be executed between them or within them, and other information may be sent and/or received. Some of the blocks or part of the blocks or one or more pieces of information can also be left out or replaced by a corresponding block or part of the block or one or more pieces of information.

For example, one or more of the means described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, decoder circuitries, encoder circuitries, other electronic units designed to perform the functions described herein by means of FIGS. 2 to 7, or a combination thereof. For firmware or software, the implementation can be carried out through modules of at least one chipset (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 8:
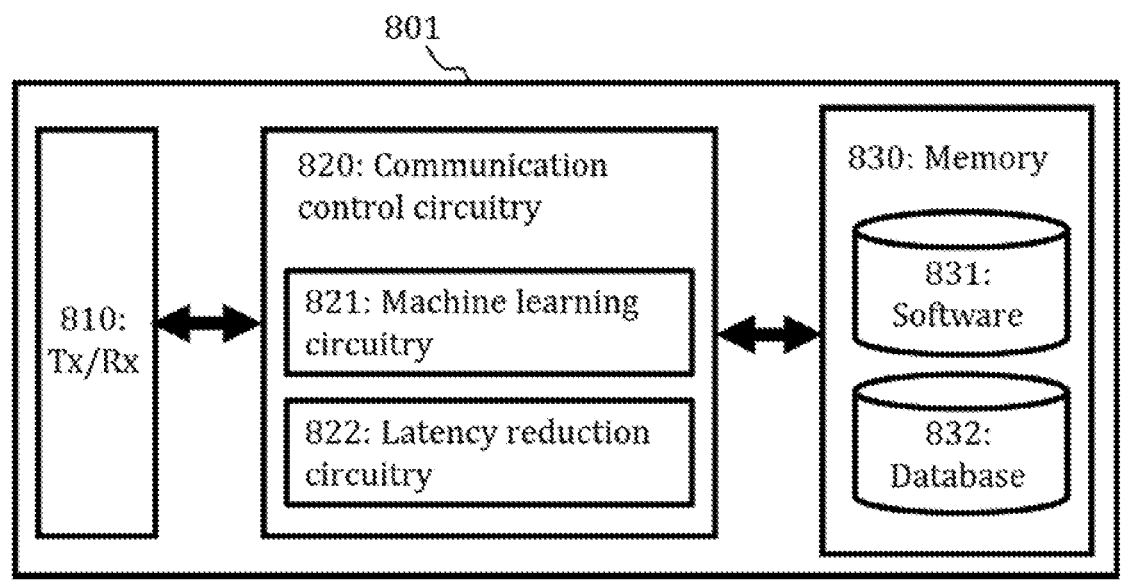
FIG. 8 illustrates an apparatus according to embodiments.

FIG. 8 provides a network node 801 according to some embodiments. FIG. 8 may illustrate a network node configured to carry out at least the functions described above in connection with predicting probabilities of failed delivery of data packets and performing proactive retransmission based on the predictions. Each network node may comprise one or more communication control circuitry 820, such as at least one processor, and at least one memory 830, including one or more algorithms 831, such as a computer program code (software) wherein the at least one memory and the computer program code (software) are configured, with the at least one processor, to cause, respectively, the network node to carry out any one of the exemplified functionalities of the network node described above.

Referring to FIG. 8, the communication control circuitry 820 of the network node comprises at least machine learning circuitry 821 and latency reduction circuitry 822. The machine learning circuitry 821 may be configured to carry out the machine learning-related functionalities according to embodiments and, to this end, to carry out at least some of the functionalities described above by means of any of block 203 of FIG. 2, block 303 of FIG. 3, FIG. 4, FIG. 5, FIG. 6 and block 701 of FIG. 7 (partly) using one or more individual circuitries. The latency reduction circuitry 822 may be configured to carry out the rest of the functionalities according to embodiments and, to this end, to carry out at least some of the functionalities described above by means of any of blocks 201, 202, 205 to 208 of FIGS. 2, 301, 302, 304 to 310 of FIG. 3 and elements 701 (partly), 702, 705 of FIG. 7 using one or more individual circuitries.

The memory 830 may comprise a database 832 which may comprise, for example, the (trained) machine learning algorithm, one or more measurement data sets and/or a learning data set, as described in connection with previous embodiments. The memory 830 may also comprise other databases which may not be related to the functionalities of the network node according to any of presented embodiments. The memory 830 may be implemented using any suitable data storage technology, such as semiconductor based memory devices, flash memory, magnetic memory devices and systems, optical memory devices and systems, fixed memory and removable memory.

Referring to FIG. 8, the network node may further comprise different interfaces 810 such as one or more communication interfaces (TX/RX) comprising hardware and/or software for realizing communication connectivity over the medium according to one or more communication protocols. Specifically, the communication interface 810 may provide the network node with communication capabilities to communicate in the wireless communication system and enable communication to one or more access nodes, one or more terminal devices and to one or more other network nodes or elements (e.g., to one or more core network elements). The communication interface may comprise standard well-known components such as an amplifier, filter, frequency-converter, (de)modulator, and encoder/decoder circuitries, controlled by the corresponding controlling units, and one or more antennas. The network node may possible also comprise at least one user interfaces.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form processing means or comprises one or more computer program code portions for carrying out one or more operations according to any one of the embodiments of FIGS. 2 to 7 or operations thereof.

In an embodiment, at least some of the processes described in connection with FIGS. 2 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A network node for transmitting data packets over one or more wireless communication links to one or more receivers, the network node comprising:
   at least one processor; and
   at least one memory including computer program code,
      said at least one memory and computer program code being configured to, with said at least one processor, cause the network node to perform:
   maintaining, in a database, a trained machine learning algorithm for predicting a probability of failed delivery of data packets over the one or more wireless communication links based on measurements relating to the one or more wireless communication links;
   receiving a raw measurement data stream by performing measurements over the one or more wireless communication links;
   separating, from the raw measurement data stream, one or more data streams associated with the one or more wireless communication links;
   if any of the one or more data streams comprises string data, performing word embedding for said string data,
   filling any temporal data gaps in the one or more data streams with surrogate values to form one or more pre-processed data streams;
   performing feature engineering on the one or more pre-processed data streams to form a measurement data set for each of the one or more wireless communication links; and
   performing, for each of the one or more wireless communication links as a first wireless communication link, the following:
      predicting, using the trained machine learning algorithm, a probability of failed delivery of a data packet over the first wireless communication link to a first receiver, wherein a corresponding measurement data set is used as an input of the trained machine learning algorithm,
      determining whether the probability of failed delivery of the data packet over the first wireless communication link exceeds a threshold, and
      in response to the probability of failed delivery of the data packet exceeding the threshold, transmitting the data packet over the first wireless communication link to the first receiver and transmitting to the first receiver one of a copy of the data packet and redundancy data for the data packet.

2. The network node of claim 1, wherein the network node is further configured to perform, for each of the one or more wireless communication links, the following:
in response to the probability of failed delivery of the data packet failing to exceed the threshold, transmitting the data packet over the first wireless communication link to the first receiver.

3. The network node of claim 1, wherein the network node is further configured to perform, for each of the one or more wireless communication links, the following:
in response to receiving a negative acknowledgment from the first receiver after the transmission of the data packet, adjusting the trained machine learning algorithm or the threshold based on the negative acknowledgment.

4. The network node according to claim 1, wherein the measurement data set acting as the input of the trained machine learning algorithm for the first wireless communication link corresponds to measurements performed over a pre-defined time window.

5. The network node according to claim 4, wherein the pre-defined time window corresponds to a pre-defined number of preceding transmission time intervals.

6. The network node according to claim 1, wherein the measurement data set acting as the input of the trained machine learning algorithm for the first wireless communication link comprise system measurements of the network node or radio measurements of the first wireless communication links.

7. The network node according to claim 1, wherein the measurement data set acting as the input of the trained machine learning algorithm for the first wireless communication link comprises measurement data of one or more measurements of one or more of the following types:
a channel quality indicator, CQI, compensation factor for one or more data channels or one or more control channels;
a compound CQI of one or more spatial streams associated with the network node;
a modulation and coding scheme, MCS,
a modulation order,
an average signal-to-noise ratio, SNR, of an associated radio bearer group,
an average throughput of the first receiver over the physical downlink shared channel, PDSCH,
an average amount of allocated PDSCH resources for the first receiver and
a recommended MCS for the hybrid automatic repeat request, HARQ retransmissions.

8. The network node according to claim 1, wherein the network node is further configured to define the threshold dynamically for each of the one or more wireless communication links based on one or more of the following:
amount of available resources in the network node,
a pre-defined reliability requirement of a corresponding wireless communication link,
a pre-defined efficiency requirement of a corresponding wireless communication link,
a latency requirement of a corresponding wireless communication link or of the data packet to be transmitted and
a statistical accuracy of the trained machine learning algorithm.

9. The network node according to claim 1, wherein the network node is further configured to perform the transmitting of said one of the copy of the data packet and the redundancy data to the first receiver over the first wireless communication link or by relay using at least a second wireless communication link of the one or more wireless communication links or by relay using at least a fixed wired communication link between the network node and a wired receiver.

10. The network node according to claim 1, wherein the first receiver comprises a first terminal device, and the network node is configured to, in response to the probability of failed delivery of the data packet exceeding the threshold, select one of a plurality of redundancy actions following a pre-defined selection criteria and perform the transmitting of said one of the copy of the data packet and the redundancy data accordingly, the plurality of redundancy actions comprising one or more of:
transmitting the copy of the data packet to the first terminal device over the first wireless communication link,
transmitting the redundancy data to the first terminal device over the first wireless communication link,
transmitting the copy of the data packet to the first terminal device by relaying the copy over a second wireless communication link between the network node and an access node and over one or more third wireless communication links between the access node and the first terminal device,
transmitting the redundancy data to the first terminal device by relaying the redundancy data over a second wireless communication link between the network node and an access node and over one or more third wireless communication links between the access node and the first terminal device,
transmitting the copy of the data packet to the first terminal device by relaying the copy over a second wireless communication link between the network node and a second terminal device and over one or more third wireless communication links between the second terminal device and the first terminal device,
transmitting the redundancy data to the first terminal device by relaying the redundancy data over a second wireless communication link between the network node and a second terminal device and over one or more third wireless communication links between the second terminal device and the first terminal device,
transmitting the copy of the data packet to the first terminal device by transporting the copy over a fixed wired communication link between the network node and an access node and over one or more fourth wireless communication links between the access node and the first terminal device and
transmitting the redundancy data to the first terminal device by transporting the redundancy data over a fixed wired communication link between the network node and an access node and over one or more fourth wireless communication links between the access node and the first terminal device.

11. The network node according to claim 10, wherein the pre-defined selection criteria comprise at least criteria for one of an availability of each action, a system state of the network node and a configuration of the network node.

12. The network node according to claim 1, wherein the network node is further configured to, in response to the probability of failed delivery of the data packet exceeding the threshold, adjust the amount of redundant information included in the redundancy data based on results of the predicting and perform the transmitting of the redundancy data.

13. The network node according to claim 1, wherein the network node is further configured to generate and train the trained machine learning algorithm by performing the following:
   causing performing measurements to form a training data set comprising information on delivery of data packets over the one or more wireless communication links and information on measurements relating to the one or more wireless communication links concurrent with the delivery of the data packets;
   initializing a machine learning algorithm;
   training the machine learning algorithm using the training data set, wherein the information on the measurements relating to the one or more wireless communication links define features of the machine learning algorithm and the information on the delivery of data packets over the one or more wireless communication links define labels of the machine learning algorithm; and
   storing the machine learning algorithm to the database.

14. The network node according to claim 13, wherein the network node is further configured to process a raw training data stream to form the training data set, before the training, by performing the following:
   separating, from the raw training data stream, one or more data streams associated with the one or more wireless communication links;
   if any of the one or more data streams separated from the raw training data stream comprises string data, performing word embedding for said string data;
   filling any temporal data gaps in the one or more data streams separated from the raw training data stream with surrogate values to form one or more pre-processed data streams of the raw training data stream; and
   performing feature engineering and assigning labels on the one or more pre-processed data streams of the raw training data stream.

15. The network node according to claim 1, wherein each surrogate value corresponds to a zero or a preceding value for a corresponding data stream depending on a type of associated data.

16. The network node according to claim 1, wherein the trained machine learning algorithm is based on an XGBoost algorithm, one or more multilayer perceptron networks, one or more recurrent neural networks, one or more long short term memories, LSTMs, one or more gated recurrent units, GRUs, or a combination thereof.

17. The network node according to claim 1, wherein the network node comprises an access node or a terminal device.

18. The network node according to claim 1, wherein the one or more receivers comprise one or more access nodes or one or more terminal devices.

19. A method for transmitting data packets over one or more wireless communication links to one or more receivers, the method comprising:
   maintaining, in a database, a trained machine learning algorithm for predicting a probability of failed delivery of data packets over the one or more wireless communication links based on measurements relating to the one or more wireless communication links;
   receiving a raw measurement data stream by performing measurements over the one or more wireless communication links;
   separating, from the raw measurement data stream, one or more data streams associated with the one or more wireless communication links;
   if any of the one or more data streams comprises string data, performing word embedding for said string data,
   filling any temporal data gaps in the one or more data streams with surrogate values to form one or more pre-processed data streams;
   performing feature engineering on the one or more pre-processed data streams to form a measurement data set for each of the one or more wireless communication links; and
   performing, for each of the one or more wireless communication links as a first wireless communication link, the following:
      predicting, using the trained machine learning algorithm, a probability of failed delivery of a data packet over the first wireless communication link to a first receiver, wherein a corresponding measurement data set is used as an input of the trained machine learning algorithm,
      determining whether the probability of failed delivery of the data packet over the first wireless communication link exceeds a threshold, and
      in response to the probability of failed delivery of the data packet exceeding the threshold, transmitting the data packet over the first wireless communication link to the first receiver and transmitting to the first receiver one of a copy of the data packet and redundancy data for the data packet.

20. A computer program embodied on a non-transitory computer-readable medium, said computer-readable medium including instructions stored thereon which, when run on hardware, control the hardware to perform at least the following:
   receiving a raw measurement data stream by performing measurements over the one or more wireless communication links;
   separating, from the raw measurement data stream, one or more data streams associated with the one or more wireless communication links;
   if any of the one or more data streams comprises string data, performing word embedding for said string data,
   filling any temporal data gaps in the one or more data streams with surrogate values to form one or more pre-processed data streams; and
   performing feature engineering on the one or more pre-processed data streams to form a measurement data set for each of the one or more wireless communication links;
   performing, for each of the one or more wireless communication links as a first wireless communication link, the following:
      predicting, using a trained machine learning algorithm with a corresponding measurement data set as an input, a probability of failed delivery of a data packet over the first wireless communication link to a first receiver, wherein the trained machine learning algorithm is a trained algorithm for predicting a probability of failed delivery of data packets over the one or more wireless communication links based on measurements relating to the one or more wireless communication links,
      determining whether the probability of failed delivery of the data packet over the first wireless communication link exceeds a threshold, and in response to the probability of failed delivery of the data packet exceeding the threshold, transmitting the data packet over the first wireless communication link to the first receiver and transmitting to the first receiver one of a copy of the data packet and redundancy data for the data packet.

\* \* \* \* \*